(12) United States Patent
Bruno et al.

(10) Patent No.: US 7,532,969 B2
(45) Date of Patent: May 12, 2009

(54) GAS TURBINE SPEED DETECTION

(75) Inventors: Vittorio Bruno, Mississauga (CA); Francis Bonacorsi, Candiac (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 483 days.

(21) Appl. No.: 11/370,830

(22) Filed: Mar. 9, 2006

(65) Prior Publication Data

US 2007/0213917 A1    Sep. 13, 2007

(51) Int. Cl.
*G06F 19/00* (2006.01)
(52) U.S. Cl. .............................. 701/100; 324/178
(58) Field of Classification Search .............. None
See application file for complete search history.

(56) References Cited

U.S. PATENT DOCUMENTS

| | | | | |
|---|---|---|---|---|
| 4,075,562 A | * | 2/1978 | Karstensen et al. | 324/173 |
| 4,521,894 A | * | 6/1985 | Moffat | 377/16 |
| 4,733,155 A | * | 3/1988 | Smith | 322/10 |
| 5,127,220 A | * | 7/1992 | Jesrai et al. | 60/778 |
| 2005/0200349 A1 | | 9/2005 | Duke | |

FOREIGN PATENT DOCUMENTS

JP        2002-323369        * 11/2002

* cited by examiner

*Primary Examiner*—Michael J. Zanelli
(74) *Attorney, Agent, or Firm*—Ogilvy Renault LLP

(57) ABSTRACT

A gas turbine engine having at least a rotor shaft operatively connecting a compressor apparatus and a turbine apparatus, comprises an auxiliary gear box and a phonic wheel apparatus. The auxiliary gear box is drivingly connected to the rotor shaft and the phonic wheel apparatus includes an oil pump having toothed gear and a sensor mounted to the oil pump for sensing a rotational speed of the toothed gear.

9 Claims, 2 Drawing Sheets

GAS TURBINE SPEED DETECTION

TECHNICAL FIELD

The invention relates generally to gas turbine engines, and more particularly, to an improved method and apparatus for detecting the rotational speed of a gas turbine engine.

BACKGROUND OF THE ART

The rotational speed of a gas turbine engine, particularly the rotational speed of the high pressure spool shaft of the engine (sometimes referred to as the N2 speed), is a primary input variable necessary for the control logic of a gas turbine engine. In the prior art, engine speed is detected by way of a sensor positioned adjacent to a phonic wheel which is usually incorporated at a suitable location along a rotor of the engine, such as the high pressure spool shaft. A phonic wheel typically defines a number of slots extending therethrough and is mounted on a rotor shaft. A medium such as a beam of light, a magnetic field, etc. is employed such that the sensor receives the medium affected by the slots of the phonic wheel when rotating, thereby enabling it to provide data regarding the rotational speed of the rotor shaft. The phonic wheel and the associated sensor are conventionally buried within the engine, which makes access thereto for maintenance and repair very difficult. Furthermore, the conventional location of the phonic wheel and associated sensor of a gas turbine engine is in a high temperature environment inside of the engine and this can cause a high differential thermal expansion mismatch between the sensor and the tips of the phonic wheel.

Accordingly, there is a need to provide an improved method and apparatus for detecting the rotational speed of gas turbine engines.

SUMMARY OF THE INVENTION

It is therefore an object of this invention to provide a method and apparatus for detecting a rotational speed of a rotor shaft of a gas turbine engine, overcoming the shortcomings of the prior art.

In one aspect, the present invention provides gas turbine engine having at least one rotor shaft operatively connecting a compressor apparatus and a turbine apparatus. The gas turbine engine further comprises an auxiliary gear box and a phonic wheel apparatus. The auxiliary gear box is drivingly connected to the rotor shaft, and the phonic wheel apparatus includes a toothed gear of the auxiliary gear box and a sensor for sensing a rotational speed of the toothed gear In another aspect, the present invention provides an auxiliary gear box of a gas turbine engine which is drivingly connected to a rotor shaft of the engine. The auxiliary gear box comprises at least one pair of gears thereof to rotate in a fixed ratio with respect to a rotational speed of the rotor shaft, and a sensor adjacent to one of the gears for determining a rotational speed of the rotor shaft.

In another aspect, the present invention provides method for detecting a rotational speed of a rotor shaft of a gas turbine engine, which operatively connects a compressor apparatus and a turbine apparatus, and drivingly connects an auxiliary gear box. The method comprises detecting a rotational speed of one toothed gear associated with the auxiliary gear box as the toothed gear rotates in a fixed ratio with respect to the rotational speed of the rotor shaft and determining the rotational speed of the rotor shaft based on the detected rotational speed of the toothed gear and the fixed ratio.

Further details of these and other aspects of the present invention will be apparent from the detailed description and drawings included below.

DESCRIPTION OF THE DRAWINGS

Reference is now made to the accompanying drawings depicting aspects of the present invention, in which.

DETAILED DESCRIPTION OF THE PREFERRED EMBODIMENTS

Figure 1:
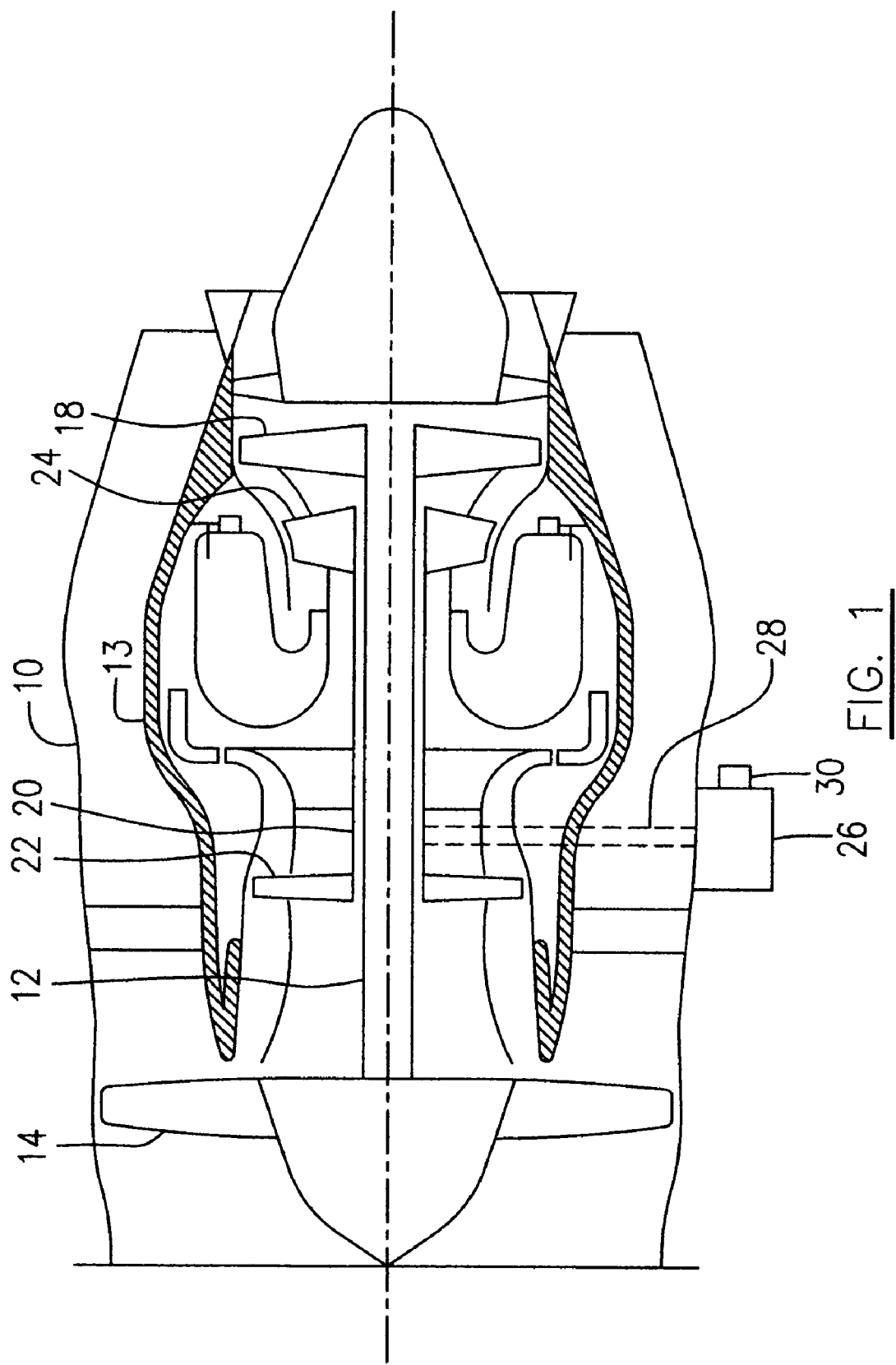
FIG. 1 is a schematic cross-sectional view of a turbofan gas turbine engine as an example illustrating an application of the present invention.

Referring to FIG. 1, a turbofan gas turbine engine incorporating an embodiment of the present invention is presented as an example of the application of the present invention, and includes a engine case 10, a core casing 13, a low pressure spool assembly seen generally at 12 which includes a fan assembly 14 and a low pressure turbine assembly 18, and a high pressure spool assembly seen generally at 20 which includes a compressor assembly 22 and a high pressure turbine assembly 24. The core casing 13 surrounds the low and high pressure spool assemblies 12 and 20 in order to define a main fluid path (not indicated) therethrough. An auxiliary gear box (AGB) 26 attached to the engine case 10 of the engine is drivingly connected by a tower shaft 28 to the shaft (not indicated) of the high pressure spool assembly 20 such that the speed reduction gears of the AGB 26 rotate at a fixed ratio with respect to the rotational speed of the shaft of the high pressure spool assembly 20. The AGB 26 further includes a plurality of accessories such as an oil gear pump 30, a generator, etc. which are affixed to the AGB 26 and are driven by the AGB 26 such that these accessories also rotate in a fixed ratio with respect to the rotational speed of the shaft of the high pressure spool assembly 20. A starter (not shown) is also conventionally affixed to the gearbox and is drivingly connected to the shaft of the high pressure spool assembly 20 through the tower shaft 28.

Therefore, in accordance with the present invention, it is preferred to determine the rotational speed of the shaft of a high pressure spool assembly 20 based on the rotational speed of one of the gears associated with the AGB 26, such as the oil gear pump 30, and the fixed rotation ratio of the gear with respect to the rotational speed of the shaft of the high pressure spool assembly 20.

Figure 2:
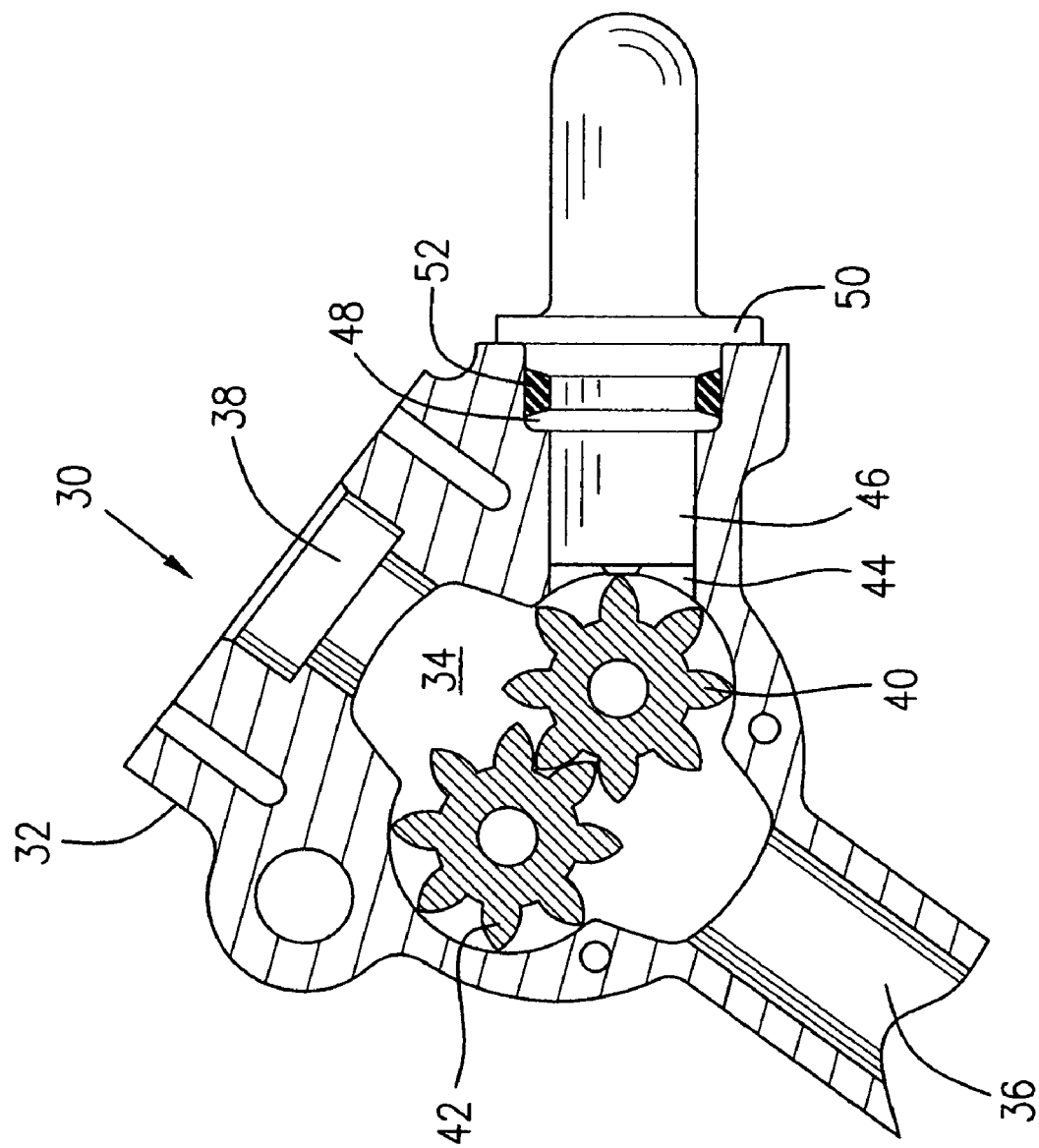
FIG. 2 is schematic cross-sectional view of an oil gear pump affixed to an auxiliary gearbox of the engine of FIG. 1, incorporating an embodiment of the present invention.

Referring to FIGS. 1 and 2, one embodiment of the present invention includes the oil gear pump 30 which is an AGB scavenge gear pump used in a lubricating system (not shown) of the gas turbine engine. The oil gear pump 30 is affixed to and driven by the AGB 26. The oil gear pump 30 preferably includes a body or housing 32 defining a cavity 34 therein with an inlet 36 and outlet 38 in fluid communication with the cavity 34, thereby allowing oil to flow through the housing 32 via the inlet 36, the cavity 34 and the outlet 38. A pair of preferably identical toothed gears 40, 42 in a gearing relationship, are operatively mounted to the housing 32 within the cavity 34 of the oil gear pump 30.

The cavity 34 has a profile such that the gears 40, 42 can rotate in a gearing relationship without interfering with the surfaces of the cavity 34, but will substantially block the oil flow passing through the cavity between the inlet 36 and the outlet 38 when the gears 40 and 42 are not rotating. One of the gears 40, 42 is driven to rotate by the AGB 26 and the other is a free gear which rotates together with but in the opposite rotational direction of the gear driven by the AGB 26. When the gears 40, 42 rotate, oil contained in slots defined by adjacent teeth of the respective gears 40, 42 is forced to move within the cavity 34 from the inlet side to the outlet side or vice versa, depending on the rotational direction of the gears 40, 42.

The housing 32 of the oil gear pump 30 further preferably defines a hole 44 extending thereinto and intersecting the cavity 34, for receiving therein a sensor 46 such as a N2 speed probe of a magnetic type, such as a magnetic speed pick-up. The sensor 46 received in the hole 44 in the pump housing 32, is adjacent to the gear 40, preferably extending radially toward thereto with a predetermined clearance therebetween. Flanges 48, 50 of the sensor 46 ensure the predetermined clearance between the sensor 46 and the tips (not indicated) of the gear 40 such that the sensor 46 is enabled to detect variations in a magnetic field disturbed by the teeth and slots of the gear 40 passing thereby when the gear 40 rotates. The rotational speed of the gear 40 is calibrated from the detected variations in the magnetic field. Thus, the gear 40 and the sensor 46 in combination form a phonic wheel apparatus although the primary function of the gear 40 is one of the rotors of the oil gear pump for pressurizing an oil flow.

The environment of the phonic wheel is wet, as the gear and sensor are subject to oil flow in the area. An O-ring seal 52 is preferably provided between the hole 44 and the sensor 46 to prevent oil leakage from the cavity 34.

The sensor 46 is in electrical contact with the electrical engine control (EEC) (not shown) of the gas turbine engine. Thus, data regarding the rotational speed of gear 40 is provided to the EEC.

As described, the AGB 26 is drivingly connected through the tower shaft 28 to the shaft of the high pressure spool assembly 20 and the pair of gears 40, 42 are driven to rotate by the AGB 26, therefore the rotational speed of gear 40 is in a fixed ratio with respect to the rotational speed of the shaft of high pressure spool assembly 20. This fixed ratio is known when the engine is designed and manufactured. Therefore, the instant rotational speed of the shaft of the high pressure spool assembly 20 (N2 speed) can be determined based on a calculation of the detected instant rotational speed of the gear 40 and the known fixed ratio. This is computed from time to time by the EEC and, as an output result, the instant N2 speed other than the rotational speed of gear 40 is displayed and is used as a primary input variable necessary for the control logic of the gas turbine engine.

The oil pump-mounted solution of the present invention is novel and has several advantages, including a novel location within the AGB which results in, among other things, a reduced tolerance stack-up and a low differential thermal expansion mismatch between the sensor 46 and the gear tips.

The above description is meant to be exemplary only, and one skilled in the art will recognize that changes may be made to the embodiments described without departure from the scope of the invention disclosed. For example, the present invention can be applied to various types of gas turbine engines other than a turbofan gas engine which is used as an example to illustrate the application of the present invention. The oil gear pump incorporating a phonic wheel apparatus can be affixed to an AGB either outside or inside of the AGB. The sensor can be selected from any suitable types, although a magnetic speed probe is used in the embodiment of this invention. The sensor can be mounted by any suitable support structure other than the body of the oil gear pump, depending on the location of the AGB gear being selected to function as a phonic wheel. Still other modifications which fall within the scope of the present invention will be apparent to those skilled in the art, in light of a review of this disclosure, and such modifications are intended to fall within the appended claims.

The invention claimed is:

1. A gas turbine engine having at least one rotor shaft operatively connecting a compressor apparatus and a turbine apparatus, the gas turbine engine comprising an auxiliary gear box and a phonic wheel apparatus, the auxiliary gear box being drivingly connected to the rotor shaft, and the phonic wheel apparatus including a toothed gear of an oil pump and a sensor, the oil pump mounted to the auxiliary gear box, the sensor mounted to a housing of the oil pump and adapted to sense a rotational speed of the toothed gear.

2. The gas turbine engine as defined in claim 1 wherein the oil pump is a scavenge gear pump.

3. The gas turbine engine as defined in claim 1 wherein the oil pump further comprises a cavity defined in the housing and a pair of rotatable gears within the cavity, the housing further defining a hole intersecting the cavity for receiving the sensor therein in a position in which the sensor faces tooth tips of one of the gears when the gears rotate.

4. A speed sensing apparatus for a gas turbine engine comprising an oil pump drivingly connected to a turbine rotor shaft of the engine, the oil pump including at least one gear rotating in a fixed ratio relative to the rotor shaft, and sensor means mounted to the oil pump for determining a rotational speed of the rotor shaft from rotation of said gear.

5. The apparatus as defined in claim 4 wherein the oil pump is a gear pump.

6. The apparatus as defined in claim 5 wherein the oil pump comprises a body defining a cavity therein for operatively containing a pair of gears including said at least one gear, the body further defining a hole extending thereinto and intersecting the cavity for receiving the sensor means therein.

7. The apparatus as defined in claim 5 further comprising clearance means to ensure a clearance between said sensor means held in position and tooth tips of the gear when the gear rotates.

8. A method for detecting a rotational speed of a rotor shaft of a gas turbine engine, the rotor shaft operatively connecting a compressor apparatus and a turbine apparatus, and drivingly connecting an auxiliary gear box, the method comprising:
   detecting a rotational speed of one toothed gear of an oil pump associated with the auxiliary gear box, the toothed gear rotating in a fixed ratio with respect to the rotational speed of the rotor shaft; and
   determining a rotational speed of the rotor shaft based on the detected rotational speed of the toothed gear and the fixed ratio.

9. The method as defined in claim 8 wherein detection of the rotational speed of the toothed gear is conducted using the toothed gear as a phonic wheel.

* * * * *